Nov. 1, 1966  R. S DITTO  3,283,232
CONTACT METER WITH PHOTO-ACTUATED SERVO MEANS
Filed June 21, 1963  2 Sheets-Sheet 1

INVENTOR.
RICHARD S. DITTO
BY
Nelson E. Kimmelman
ATTORNEY

United States Patent Office 3,283,232
Patented Nov. 1, 1966

3,283,232
CONTACT METER WITH PHOTO-ACTUATED SERVO MEANS
Richard S. Ditto, Newark, Del., assignor to Emcee Electronics, Inc., Claymont, Del., a corporation of Delaware
Filed June 21, 1963, Ser. No. 289,513
6 Claims. (Cl. 318—31)

This invention relates to meters and in particular to meter-relays sometimes known as "contact meters."

In the field of process control a device that is often used is a meter which has, for example, a D'Arsonval meter movement with indicator and dial and, additionally, a selected number of auxiliary arms or pointers which may be set by an operator at predetermined points on the dial corresponding to operating points at which desired switching actions or alarms, for example, are to be actuated. When the main meter indicator comes into proximity or contact with the settable indicator a circuit is closed which actuates the switch. For example, it is often desirable to control or signal the upper or lower limits of a process whose amplitude is indicated by the main meter indicator.

There are a number of available meters of this type generally classified in one of three categories, i.e., electromechanically actuated, magnetically actuated, and photo actuated. Of the electromechanically actuated type there are available meters in which the contact of the main meter indicator with the settable pointer directly operates very sensitive relays which, in turn, control high power loads. Other types operate transistors which, in turn, operate relays that control high power loads. As the main indicator arm of the meter moves fairly rapidly and is very light, it is difficult to insure its positive contact with the settable member. For this reason, such meters usually have means for "locking-in" the main meter indicator once it touches the settable member. However, while this insures a good contact, it prevents the main meter indicator from moving once the initial contact has been made. Thus the operator cannot monitor subsequent variations in the conditions indicated by the meter, unless an interruptor circuit is used to periodically break the contact.

Another type of contact meter is so designed that only a relatively light contact of the main indicator with the settable member is necessary to operate a transistor circuit which in turn controls relays capable of handling large power tubes. However, this very lack of lock-in makes for a relatively large lack of reliability in the closure of the contacts themselves and in the repeatability of the closure point. In this latter type of contact meter, too, there usually is no provision made for permitting the meter to indicate subsequent variations after closure of the contacts has been effective. In addition, in certain industrial environments, both types are not sufficiently reliable because of their fragility and the fact that the contacts are inclined to corrode readily.

The photosensitive type of contact-meter usually is arranged so that a vane or flag connected to the main meter indicator interrupts a light beam shining upon a photocell when the main indicator arm passes the settable pointer. The change in the resistance of the photosensitive member (or in any other of its specified characteristics occasioned thereby) is used to produce a change in an electronic circuit that controls power relays. With this type of meter, it is relatively easy to provide means for permitting the operator to monitor the variations in the condition indicated by the meter after the contact has been made, but it also suffers from the drawback of poor repeat characteristics of the point at which it will make contact. In addition, it is difficult to provide a narrow differential gap, that is, the closeness with which the upper and lower limits may be set by two settable pointers.

Contact meters of the magnetic type suffer from the disadvantage that inaccuracies can result from the magnetic interaction between the magnetic means and the means attracted thereby, or from changes in the strength of the magnetic elements.

It is also characteristic of known contact-meters that they cannot be directly used for providing a directly associated and directly driven output for driving potentiometers, variable transformers or digital converters, to mention a few examples.

It is therefore among the objects of this invention to provide:

(1) A novel contact meter which provides positive actuation of switches in response to the movement of the main indicator to one or more predetermined positions, yet the main meter indicator can move freely at all times to indicate subsequent variations in the operation being monitored.

(2) A novel contact meter in which the repeat characteristics of switch actuation produced thereby are extremely high.

(3) A novel contact meter which is useful in practically any environment because of its ruggedness and resistance to corrosive atmospheres.

(4) A novel contact meter in which the settable pointers may be positioned extremely close to one another or may be aligned with one another, or may even be positioned to overlap one another.

(5) A novel contact meter with provision for a directly-operated mechanical output for actuating potentiometers, variable transformers, and similar apparatus.

(6) A novel contact meter free of undesired magnetic interactions between a main indicator and an associated switch mechanism.

Other objects of the invention will become apparent to those skilled in the art upon perusal of the drawings, specification and claims herein.

These and other objects of the invention are achieved, in accordance with my invention, by means of a novel contact meter in which photo-actuated servo means carrying switches are directly associated with the movement of the main meter indicator. There are two settable pointers respectively connected to two manually adjustable cams. The system is so designed that the photo servo means always follows the main indicator and, in so doing, its associated switches ride on predetermined portions of the cams. Thus, if the main indicator moves toward the right, the photo servo with its switches follows until the main indicator is aligned with one of the pointers whereupon the servo-switch will be actuated by riding on a predetermined portion of the corresponding cam. If the main meter indicator moves in the opposite direction the photo servo follows it until the appropriate switch is actuated by its associated cam when the indicator is aligned with the other pointer. If desired, the motor which causes the servo to follow the indicator may be directly connected to drive a potentiometer for remotely indicating the position of the main indicator or for any other desired purpose.

Figure 1:
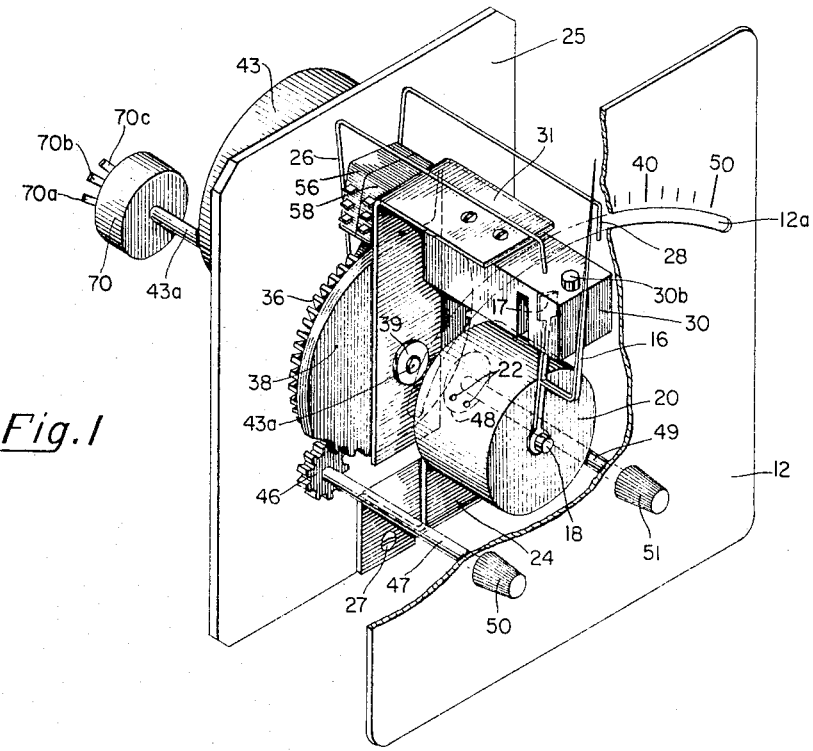
FIGURE 1 is an isometric view of the mechanical portion of my novel contact-meter.
Figure 2:
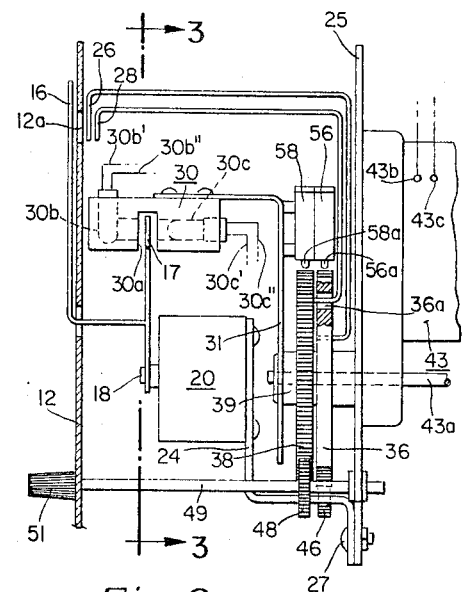
FIGURE 2 is a partly-sectional view of the apparatus shown in FIG. 1 as seen from the right side thereof.

Referring now to FIGURES 1 and 2 there is shown generally at the numeral 10 a contact meter constructed in accordance with my invention. It includes a dial 12 having desired indicia 14 thereupon. A main meter indicator 16 is connected to a shaft 18 which is coupled to a conventional D'Arsonval meter movement indicated schematically in the cylindrical housing bearing the numeral 20. The meter 20 is provided with terminals 22 which receive a current from the condition or process being monitored. As shown in FIGS. 1 and 2, the meter movement 20 is mounted on a double-bent bracket 24 that is fixedly connected to a rear supporting plate 25 by means of, for example, nut and bolt assemblies 27 (FIG. 2).

It will be noted that there is also coupled to the main meter indicator 16 a vane 17 which passes through a rectangular passageway 30a in a photosensitive servo or follower subassembly indicated generally at the numeral 30. The purpose of this vane will be explained in some detail hereinafter.

In order to provide a visible indication or alarm, or to actuate switches or other devices when the main meter indicator 16 is deflected to a position opposite certain of the indicia 14 there are provided two settable pointers 26 and 28 which may be positioned either behind the dial 12 as shown in FIG. 1 or may extend through the slotted portion 12a (not shown). As shown in FIG. 2, each of the pointers 26 and 28 is connected to one of the cams 36 and 38 which are concentrically mounted adjacent one another about a bushing member 39. The cam 36 has an arcuate slot 36a through which the lower part of pointer 28 passes. The cams 36 and 38 have geared portions and thus are capable of rotation relative to the bushing 39 in response to the rotation of their associated gears 46 and 48. The latter gears are mounted upon shafts 47 and 49 which are journalled at one end through bushings set in apertures in the rear support plate 25. Shafts 47 and 49 extend also through apertures in the dial 12 which are respectively aligned with those in the plate 25. Their front ends are disposed within knobs 50 and 51 respectively.

The photosensitive follower or servo subassembly 30 is affixed to an L-shaped bracket 31 which is mounted on the bushing 39 so that it rotates therewith. A motor shaft 43a from the motor 43 passes through an aperture along the longitudinal axis of the bushing 39 and is connected thereto by any appropriate means, such as a set screw in the bushing, to drive the bushing. The shaft 43a is coupled to a driving motor 43. The driving motor 43 includes terminals 43b and 43c to which leads are connected from an external circuit as will be explained below.

The photosensitive subassembly 30 includes a light source 30b which may be, for example, a Type NE-2 neon lamp and also includes a photosensitive cell 30c which may be, for example, a miniature photo cell type 304L made by the Clairex Company. The cell and light source have pairs of leads 30c′, 30c″ and 30b′ and 30b″ respectively which are coupled to a servo circuit as will be explained below.

*Operation*

Figure 3:
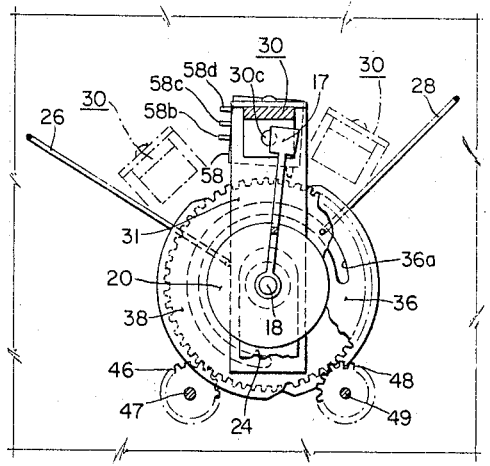
FIGURE 3 is a sectional view of the apparatus in FIG. 2 taken along the section line 2—2 in the direction indicated.

Let it be assumed, initially, that the main indicator is positioned at approximately center scale and that the assembly 30 is arranged so that, as shown in FIGS. 1 and 3, the vane 16 effectively shades the right half of the photocell 30c. The servo-circuit (FIG. 4) is so constructed that the motor 43 is cut off in this arrangement. Now, let it be asumed that the main indicator moves counterclockwise. This will shade the cell 30c even more and will upset the predetermined equilibrium condition and the servo-circuit will start the motor 43 so that bushing 39 turns counterclockwise carrying with it the bracket 31 and the subassembly 30 until the vane once again shades the right half of the cell 30c at which time the motor stops. Conversely, if the indicator 16 then starts to move clockwise, less of the cell 30c will be shaded thereby causing the servo circuit to energize the motor 43 so it moves in the opposite direction and causes the bracket 31 and subassembly 30 to follow in the clockwise direction until once again the vane shades the right half of the cell 30c and equilibrium is restored.

It will be seen that as the bracket 31 moves so do the switches 56 and 58 and their respective buttons 56a and 58a thereby traverse the edges of the geared cams 36 and 38. Hence, if the pointer 26 is set for 15 on the dial 12, when the indicator 16 becomes aligned with 15, the assembly 30 follows immediately and the button 56a will ride up on a portion of cam 36 which will depress it sufficiently to change its switching state and an external circuit will be actuated (or inactivated as the case may be). Similarly, if the pointer 28 is set at 45, for example, when the indicator 16 becomes aligned therewith, the assembly 30 will follow until it comes to rest opposite it. At that moment the switch 58 will change its state due to the cam effect of cam 38 on the switch button 58a.

It will be seen that since the part of the pointer 28 is mounted through the slot 36a of the cam 36, both pointers 26 and 28 can themselves be set very close to one another, or even can be mutually aligned.

Figure 4:
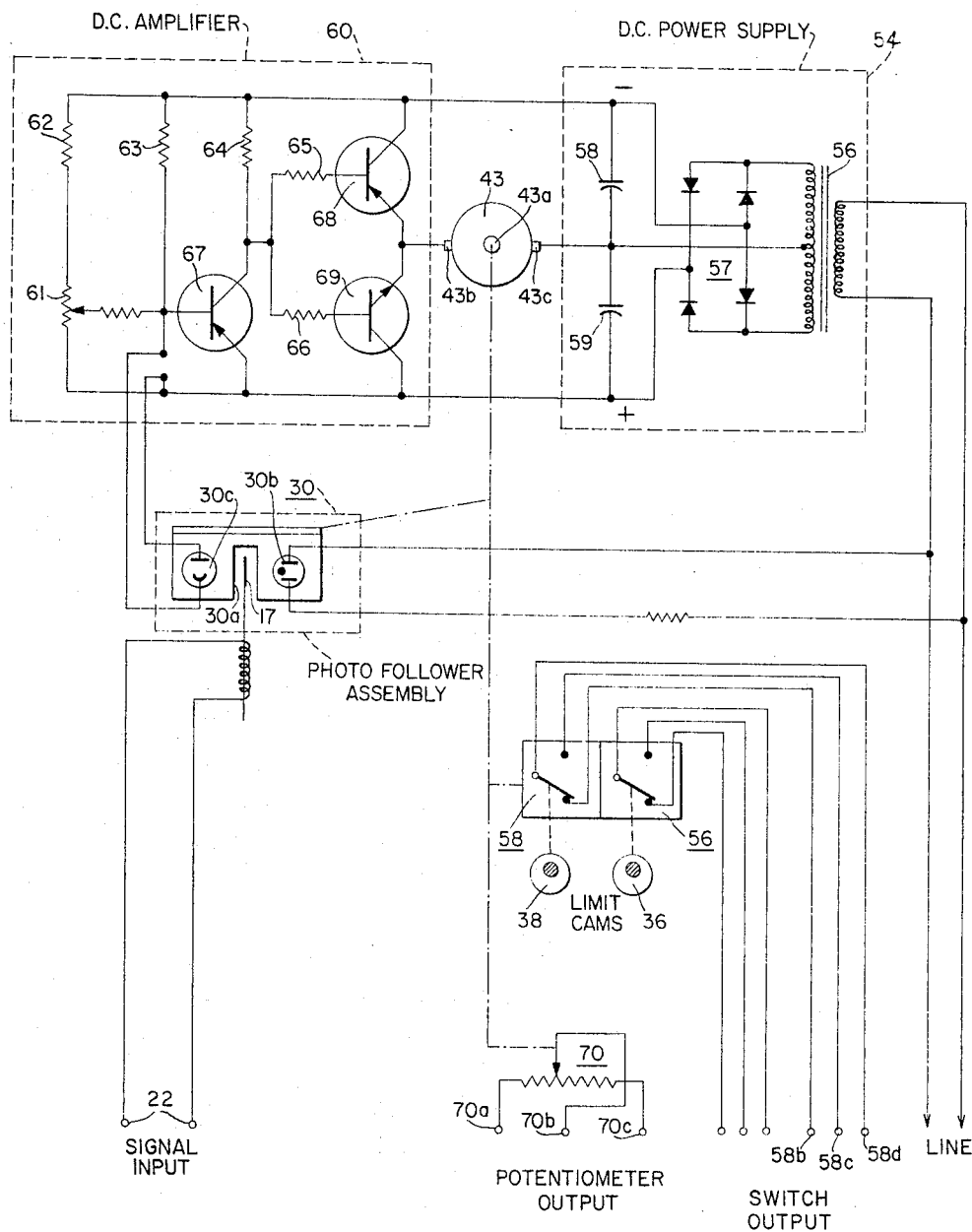
FIGURE 4 is a schematic view of the principal operating components of the meter and its associated circuit.

Referring now to FIG. 4 the schematic of one circuit which has been found to be highly satisfactory for use with the meter 10 is shown. As stated above, this circuit is so designed that it will furnish current to the motor 43 to drive the photosensitive subassembly 30 either clockwise or counterclockwise to follow the movement of the main indicator 16. This is accomplished by setting the circuit so that it operates to produce an error signal whenever only one half of the light from source 30b is permitted to impinge on photo cell 30c. The circuit shown in FIG. 4 comprises a D.C. power supply section 55 which includes a transformer 55 that is adapted to be connected to a source of line voltage such as 115 volts A.C. Connected to the secondary of the transformer 56 is a rectifier bridge 57 consisting of four unidirectional devices such as silicon diodes. Two filter capacitors 58 and 59 in series are connected across midpoints of the bridge 57 and produce respective D.C. voltage as indicated. These voltages are used to supply operating potentials to the components of the D.C. amplifier section 60 and to the motor 43.

The potentiometer 61 is so adjusted that when the vane 17 operates to block light from the lamp 30b from reaching one-half of the active area of the cell 30c, the D.C. voltage across the D.C. motor 43 will be 0. If a signal is applied to the input terminals 22 of the meter movement 20, the main indicator 16 and the vane 17 will be deflected through an arc proportional to the magnitude of that signal. If the input signal is such that it causes the vane 17 to move clockwise thereby to decrease the shading on the photo cell 30c, this will cause a decrease in the resistance of the photo cell 30c because more light will impinge thereupon. Consequently the voltage between the base and emitter of transistor 67 will decrease and the base-to-emitter voltage of the transistors 68 and 69 will increase in the negative voltage direction. Such increase will cause the NPN transistor 69 to cease conducting whereas, since transistor 68 is a PNP transistor, its conduction will increase thereby permitting current to flow through the D.C. motor 43 from terminals 43c to 43b. As a result, the shaft 43a will rotate in such a direction that the photo assembly 30 will also move clockwise until the vane 17 once more is interposed between the light source 30b and one-half of the active area of the photo cell 30c.

If the signal input to the terminals 22 was such as to cause the indicator 16 to move counterclockwise, the vane 17 would move in a direction such as to increase the shading of the photo cell 30c which would increase the resistance of photo cell 30c and thereby would increase the potential between the base and emitter of transistor 67. This, in turn, would cause the base-emitter potential of transistors 68 and 69 to increase in the positive direction. Thus transistor 69, being an NPN device, will start to conduct whereas PNP transistor 68 will have its conduction decreased. This produces a current flowing from terminal 43b to 43c of the D.C. motor 43. This reverses the direction of rotation of the shaft 43a so that the follower assembly 30 moves to overtake the vane 17 in the opposite direction until the predetermined half-shaded condition of the photo cell 30c is restored whereupon the motor will cease operation.

This servo system enables the follower assembly 30 to track the vane 17 with a high degree of positional accuracy, the error being less than one-half of 1% of full scale deflection. By adjusting the cams 38 and 36 by knobs 51 and 50 the switches 58 and 56 will be actuated when their respective cam-follower buttons 58a and 56a ride up on predetermined portions of the cam surfaces. The pointer 26 and its associated cam 36 may act as a low-limit switch which is actuated when the main indicator 16 is deflected counterclockwise and becomes aligned therewith. Conversely, the pointer 28 and its associated cam 38 may be the high limit switch which is actuated when the indicator 16 becomes aligned therewith in its movement up-scale in the clockwise direction.

Since the motor 43 is directly connected to the follower 30, it is possible to link a potentiometer 70 (FIG. 1) directly to the motor thus enabling the position of the potentiometer wiper arm to signal remotely the position of the indicator 16 by well-known techniques. Alternatively, the potentiometer can be inserted in a circuit in which there are saturable reactances or it can be inserted into a circuit in which there are silicon-controlled-rectifiers.

In one form of the circuit shown in FIG. 4 the following values of the components therein proved highly satisfactory.

| Part: | Description or value |
|---|---|
| 30b | NE-2 neon lamp. |
| 30c | 304L Clairex photocell. |
| 43 | 60 r.p.m. D.C. motor. |
| 54 | 12 v., 200 ma. transformer. |
| 56 and 58 | 1 amp., 250 vac snap switches. |
| 57 | Four 0.1 amp., 50 v. silicon rectifiers. |
| 61 | 1000 ohms. |
| 62 | 10,000 ohms. |
| 63 | 68,000 ohms. |
| 64 | 470 ohms. |
| 65 | 470 ohms. |
| 66 | 220 ohms. |
| 67 | 2N1370 transistor. |
| 68 | 2N1370 transistor. |
| 69 | 2N1302 transistor. |
| 70 | 500 ohms. |

Of course, embodiments and applications of my invention other than those specifically disclosed herein which do not depart from the essence thereof will occur to those skilled in the art. Consequently, I desire my invention to be limited solely by the claims herein.

I claim:
1. Meter apparatus comprising:
  (a) movable indicator means whose movement is responsive to the application of an electrical signal thereto, said indicator means including a light-obstructing portion,
  (b) a movable subassembly arranged to follow said indicator means whenever the latter departs from a predetermined spatial relation thereto, said subassembly including
    (i) a light source,
    (ii) a light-responsive means arranged to receive light from said source, said source and said light-responsive means being positioned to be in the path of said light-obstructing portion,
    (iii) switching means,
  (c) a selected number of settable means arranged to be set to positions corresponding to selected possible positions of said indicator, said settable means including cam means engageable by said switching means for producing cooperatively with said switching means a change in the state of said switching means whenever said subassembly moves into a predetermined spatial relation to a selected one or ones of said settable means.

2. The meter apparatus according to claim 1 with the addition of means for driving said subassembly in opposite rotary directions, and circuit means coupled to said driving means and to said subassembly for energizing said driving means as a function of the departure of said indicator from its predetermined spatial relation to said subassembly.

3. The meter apparatus according to claim 2 wherein said driving means is a D.C. motor and wherein said circuit means includes means for developing a voltage to be applied to said motor whose polarity and amplitude determine the direction and extent of movement of said subassembly in following said indicator.

4. The meter apparatus according to claim 1 wherein said light-obstructing portion is a vane fixed to said indicator means, and wherein each of said settable means includes a geared cam member and a manually-operable geared setting member which meshes therewith, said geared cam member including an elongated member connected thereto which indicates the setting of said cam member with resepct to the position of said indicator means.

5. The meter apparatus according to claim 4 wherein one of said geared cam members has a slot therein through which one of said elongated members extends, said one elongated member being connected to another of said geared cam members.

6. The meter apparatus according to claim 2 wherein a signal producing means is additionally coupled to be driven by said driving means.

References Cited by the Examiner
UNITED STATES PATENTS

| 2,471,220 | 5/1949 | Lear | 318—31 |
| 2,472,019 | 5/1949 | Kinderman | 318—480 |

ORIS L. RADER, *Primary Examiner.*

JOHN F. COUCH, *Examiner.*

B. DOBECK, *Assistant Examiner.*